United States Patent [19]

Uchida et al.

[11] 4,332,573
[45] Jun. 1, 1982

[54] SPROCKET WHEELS OF AN ENDLESS TRACK-TYPE VEHICLE

[75] Inventors: Kanichi Uchida, Tokyo; Hitoshi Sawamura, Hirakata, both of Japan

[73] Assignee: Kabushiki Kaisha Komatsu Seisakusho, Tokyo, Japan

[21] Appl. No.: 141,361

[22] Filed: Apr. 18, 1980

[30] Foreign Application Priority Data

Apr. 23, 1979 [JP] Japan .................. 54-49063

[51] Int. Cl.³ ............................................ B62D 55/12
[52] U.S. Cl. ...................... 474/94; 474/161; 474/901; 305/57
[58] Field of Search ........................ 305/21, 29, 31, 57, 305/44; 474/161–162, 901–902, 94; 152/7, 18, 44–48, 50–51

[56] References Cited

U.S. PATENT DOCUMENTS

| | | | |
|---|---|---|---|
| 655,686 | 8/1900 | Canley .................. | 305/44 X |
| 1,236,412 | 8/1917 | Dreman ................. | 152/51 |
| 1,366,540 | 1/1921 | Meyers .................. | 152/45 |
| 1,473,483 | 11/1923 | Lauhoff ................. | 152/50 |
| 3,578,822 | 5/1971 | Slemmons ............. | 305/57 X |
| 4,022,072 | 5/1977 | Chagawa et al. ...... | 305/57 X |
| 4,069,856 | 1/1978 | Sogge ................... | 305/57 X |
| 4,080,008 | 3/1978 | Groff et al. ............ | 305/57 |

FOREIGN PATENT DOCUMENTS

1150583  6/1963  Fed. Rep. of Germany ...... 474/161

Primary Examiner—Charles A. Marmor
Attorney, Agent, or Firm—Armstrong, Nikaido, Marmelstein & Kubovcik

[57] ABSTRACT

A sprocket wheel of an endless track-type vehicle has a hub and a plurality of sprocket teeth segments fixedly secured to the outermost of the hub to engage a plurality of bushings of an endless track for driving the same. The hub comprises a substantially annular-shaped radially inner part, a substantially annular-shaped radially outer part arranged movably with respect to the inner part by the interposition of a plurality of deformable resilient block segments tightly inserted into an annular space defined by and between the inner and outer parts, and a stopper mechanism for preventing the deformable resilient block segments from an excessive deformation thereof.

3 Claims, 7 Drawing Figures

2

SPROCKET WHEELS OF AN ENDLESS TRACK-TYPE VEHICLE

BACKGROUND OF THE INVENTION

1. Field of the Invention

This invention relates to a sprocket wheel of an endless track-type-vehicle, more particularly to a sprocket wheel which can absorb or reduce noise and shock at or above a preselected magnitude caused, for example, by running on a ragged ground.

2. Description of the Prior Art

During travel of an endless-track-type vehicle on a ragged ground, drive and/or driven sprocket wheels of the endless track-type vehicle are often subjected to severe impacts from other elements which are used to drive or be driven by the wheels. These repeated severe impacts sometimes generate damaging forces, undesirable wear rate, and noise which result in wastes of endless-track bushings, backward speed reduction gears, bearings, etc. The wastes of these elements tend to be expedited in proportion to an increase of weight of the vehicle.

In order to eliminate the above disadvantages, some measures have been proposed as shown in U.S. Pat. Nos. 4,022,072 4,069,856 and 4,080,008 so far as the applicant knows. However, the prior art disclosed in these patents is not sufficient to completely deal with the aforesaid disadvantages.

SUMMARY OF THE INVENTION

The present invention has been made in view of the above described circumstances.

It is therefore an aspect of the invention to provide an improved sprocket wheel of an endless-track-type vehicle which can sufficiently deal with variation of torque and severe impacts at or above a preselected magnitude applied thereto.

It is another aspect of the invention to provide an improved sprocket wheel of an endless-track-type vehicle which can absorb severe impacts applied thereto and reduce a noise of operation.

It is still another aspect of the invention to provide an improved sprocket wheel of an endless-track-type vehicle which can allow the vehicle to be comfortable to ride therein.

In order to achieve the foregoing aspects of the invention, there is provided a sprocket wheel of an endless-track-type vehicle comprising a substantially annular-shaped inner part of a hub fixedly mounted on a sprocket wheel driving shaft, a substantially annular-shaped outer part of the hub arranged at the radially outside of the inner part by the interposition of a plurality of deformable resilient block segments which are tightly inserted close to one another into an annular space defined by and between the inner and outer parts and each of which is fixedly secured to the inner and outer parts at their respective one end faces, and a stopper mechanism for preventing the deformable resilient block segments from receiving an excessive deformation.

The stopper mechanism of the invention comprises an annular stopper plate fixedly secured to an end face of the outer part and having a plurality of first round openings formed at intervals of an equal distance from one another along the circumference of the end face thereof, a peripherally surrounding protrusion extending radially inwardly from the inner peripheral surface of the outer part and having a plurality of second round openings formed in position at intervals of an equal distance from one another along the circumference of the end face thereof so as to correspond to the respective positions of the first round openings of the stopper plate, the second openings having the substantially same diameter as that of the first openings, a peripherally surrounding projection extending radially outwardly from the outer peripheral surface end of the inner part and inserted between the stopper plate and the radially inwardly extending protrusion of the outer part leaving a circumferential clearance between the outer peripheral surface thereof and the inner peripheral surface of the outer part, the radially outwardly extending projection having a plurality of round notches formed in position at intervals of an equal distance from one another along the circumference of the end face thereof so as to correspond to the respective positions of the first and second openings, each of the round notches having a relatively large diameter as compared with the first and second openings, and a plurality of connecting pins press-fitted into the first and second openings and arranged such that an annular clearance having the substantially same distance as that of the circumferential clearance is defined by and between each of the connecting pins and the surface of each of the round notches.

BRIEF DESCRIPTION OF THE DRAWINGS

The foregoing and other objects, features and advantages of the present invention and the manner of attaining them will become more apparent, and the invention itself will best be understood, upon consideration of the following description of the preferred embodiment in conjunction with the accompanying drawings, in which.

DETAILED DESCRIPTION OF THE PREFERRED EMBODIMENT

Figure 1:
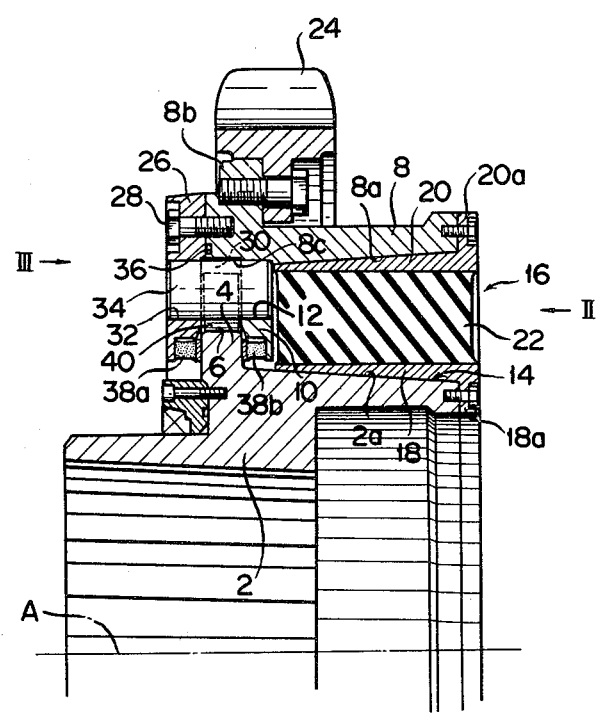
FIG. 1 is a fragmentary vertical sectional front view of a preferred embodiment of the invention.
Figure 2:
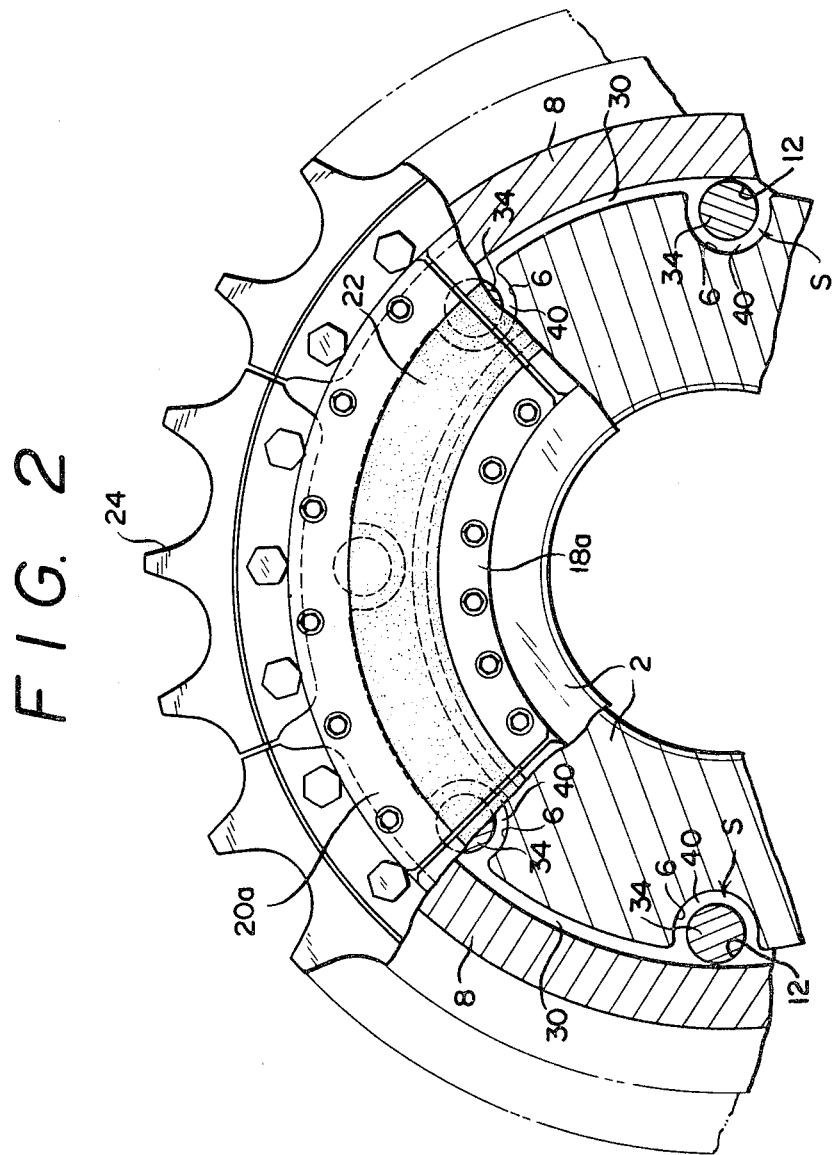
FIG. 2 is a fragmentary schematic side elevational view obtained by seeing the embodiment from the direction of an arrow II shown in FIG. 1.
Figure 3:
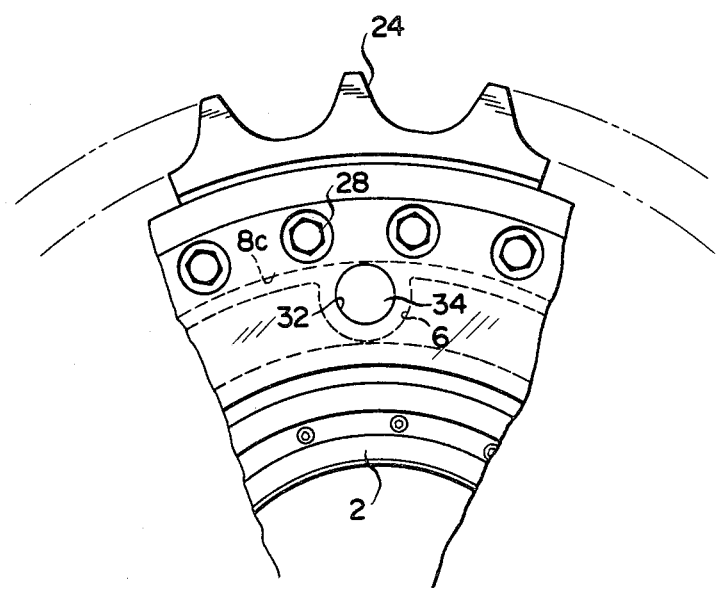
FIG. 3 is a fragmentary schematic side elevational view obtained by seeing the embodiment from the direction of an arrow III shown in FIG. 1, and FIGS. 4 to 7 are fragmentary schematic views showing operation of the embodiment of the invention.

With reference to FIG. 1, a substantially annular-shaped inner part 2 of a hub is fixedly mounted on a sprocket wheel driving shaft (not shown, but the centre axis thereof is indicated by "A"). The inner part 2 is provided at an outer peripheral surface thereof with a peripherally surrounding projection 4 extending radially outwardly and having a plurality of round notches 6 formed at intervals of an equal distance from one another along the circumference of the end face thereof. At the radially outmost side of the hub, is mounted a substantially annular-shaped outer part 8 which is provided at an inner peripheral surface thereof with a peripherally surrounding protrusion 10 extending radially inwardly and having a plurality of round openings 12 formed in position at intervals of an equal distance from one another along the circumference of the end face thereof so as to correspond to the respective positions of the round notches 6, but each having a relatively small diameter as compared with that of each of the round notches 6. The radially inwardly extending protrusion 10 is arranged at inside of and in the vicinity of the projection 4 of the inner part 2. Both the outer peripheral surface of the inner part 2 and the inner peripheral surface of the outer part 8 are partially formed in tapered surfaces 2a and 8a, respectively. The inner and outer parts 2 and 8 of the hub are arranged such that an annular conical-trapezoidal space 14 is defined by and between the tapered surfaces 2a and 8a.

Into the annular conical-trapezoidal space 14, there is fixedly inserted a plurality of deformable resilient block segments 16 arranged close to one another while being subjected to an initial compression. Each of the block segments consists of a radially inner member 18 having at one end thereof a flange portion 18a extending radially inwardly, a radially outer member 20 having at one end thereof a flange portion 20a extending radially outwardly and a resilient member 22 allowing radially inner and outer surfaces thereof to fix in seizure to radially outer surface of the inner member 18 and radially inner surface of the outer member 20, respectively. The radially inner surface of the inner member 18 and the radially outer surface of the outer member 20 are respectively formed in tapered surfaces corresponding to the respective tapered surfaces 2a and 8a of the inner part 2 and the outer part 8 of the hub so that the deformable resilient block segments 16 are tightly fitted into the annular conical-trapezoidal space 14 by means of bolts threadingly secured through the flange portions 18a and 20a to respective one end faces of the inner and outer parts 2 and 8, respectively.

A plurality of sprocket teeth segments 24 are fixedly attached by means of bolts to the side face of an outmost projection 8b extending radially outwardly from the opposite end of the outer part 8 so as to engage a plurality of bushings of an endless track (not shown) for driving the same.

To the opposite end face of the outer part 8, an annular stopper plate 26 is fixedly secured by means of bolts 28 so that a circumferential clearance 30 is defined by and between, in the axial direction, the stopper plate 26 and the radially inwardly extending protrusion 10 of the outer part 8 and, in the radial direction, the outer peripheral surface of the radially outwardly extending projection 4 and the inner peripheral surface 8c of the outer part 8 formed by the opposite end side thereof in substantially parallel to the axis A of the sprocket shaft. The stopper plate 26 radially extends to one end face of the projection 4 of the inner part, but is not connected thereto. As described above, it is understood that the projection 4 is inserted between the stopper plate 26 and the radially inwardly extending protrusion 10 of the outer part 2. Further, the stopper plate 26 has a plurality of round openings 32 formed in position at intervals of an equal distance from one another along the circumference of the end face thereof so as to correspond to the respective positions of the round openings 12 of the radially inwardly extending protrusion 10, and each having the substantially same diameter as that of the openings 12. As a result, the stopper plate 26 and the protrusion 10 of the outer part 8 can be connected with each other by means of a plurality of connecting pins 34 press-fitted into the respective openings 12 and 32 of the protrusion 10 and the stopper plate 26. By and between each of the connecting pins 34 and the surface of each of the round notches 6 of the radially outwardly extending projection 4, there is provided an annular clearance 40 having the substantially same distance as that of the circumferential clearance 30 between the outer part 8 and the projection 4. Thus, the first combination of the outer peripheral surface of the projection 4 and the inner peripheral surface 8c of the outer part 8 and also the second combination of the inner surface of each round notch 6 and the outer peripheral surface of each connecting pin 34 are arranged to function as a stopper mechanism when the resilient member 22 is subjected to an excessive compression over a preselected magnitude.

Reference numeral 36 denotes an annular O-ring provided on the opposite end face of the outer part 8, and reference numerals 38a and 38b represent annular seal rings respectively provided between the stopper plate 26 and the radially outwardly extending projection 4 and between the projection 4 and the radially inwardly extending protrusion 10. These rings is arranged for preventing leakage of a medium such as, for example, grease effecting shock-absorbing and lubricating functions which is filled up the clearances 30 and 40.

Operation of the sprocket wheel having the above described construction is hereinafter explained with reference to FIGS. 4 to 7.

Figure 4:
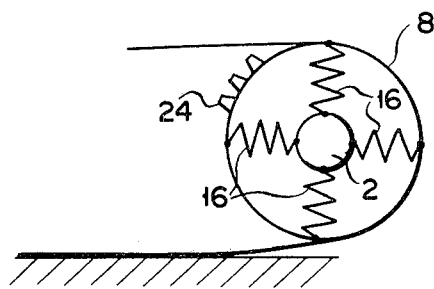

In the stationary condition of an endless-track-type vehicle, the deformable resilient block segments 16 are not subjected to any deformation as shown in FIG. 4 because of not receiving any outer force.

Figure 5:
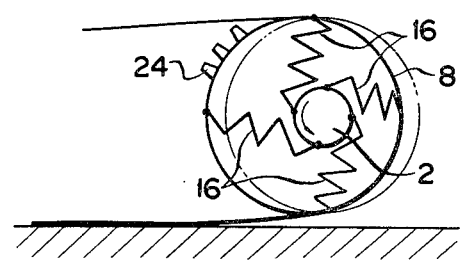

At pulling and/or at operating of a recoil spring provided between an idler wheel shaft and a track frame as a buffer member, however, the deformable resilient block segments 16 are deformed by compression as shown in FIG. 5 by receiving a pulling force or the like.

Figure 6:
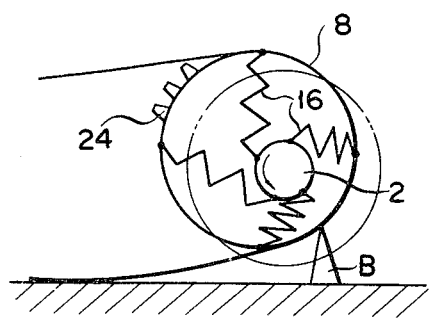

When the sprocket wheel runs on a projection B such as, for example, a stone, rock or the like in the pulling condition, the deformable resilient block segments is subjected by compression to a considerable deformation as shown in FIG. 6.

Figure 7:
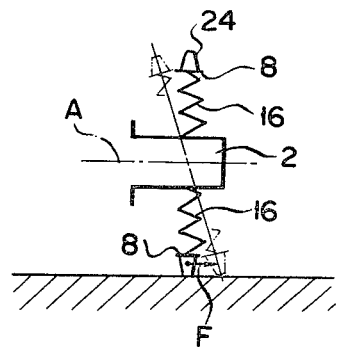

And further, in case the sprocket wheel is subjected to a thrust force F which is caused at, for example, turning the running direction, the deformable resilient block segments 16 are subjected to a shearing force as shown in FIG. 7.

As described above, the deformable resilient block segments 16 of the invention can sufficiently deal with variation of torque and severe impacts in a manner such that an energy generated by such matters is absorbed in a deformation of the deformable resilient block segments 16 with compression and/or shearing applied thereto.

When the sprocket wheel has received from the ground an unexpected heavy impact or torque which exceeds the maximum resilient force of the deformable resilient block segments 16, the outer peripheral surface of the radially outwardly extending projection 4 is struck against the inner peripheral surface 8c of the outer part 8 as well as respective peripheral surfaces of the pins 34 in question are abutted against respective inner peripheral surfaces of the round notches 6 in question so as to prevent the deformable resilient block segments 16 from an excessive deformation.

It should be noted that the deformable resilient block segments 16 are inserted into the annular conical-trapezoidal space 14 in a manner of previously receiving compression so as to enhance the resilient function thereof and to improve wear rate thereof.

What is claimed is:

1. A sprocket wheel of an endless track-type vehicle including a substantially annular-shaped inner part of a hub fixedly mounted on a sprocket wheel driving shaft, a substantially annular-shaped outer part of the hub arranged at the radially outside of said inner part so as to form an annular space therebetween, an outer peripheral surface of the inner part and an inner peripheral surface of the outer part being, respectively, formed of oppositely tapered surfaces, thereby defining said annular space as an annular conical-trapezoidal space, a plurality of deformable resilient block segments equispacedly and fixedly inserted into said annular space, and stopper means for preventing said deformable resilient block segments from their respective excessive deformation, the improvement wherein each of said deformable resilient block segments comprises:

(a) a radially inner member having at one end thereof a flange portion extending radially inwardly and fixedly secured through said flange portion to one end face of said inner part by means of bolts, the inner peripheral surface being formed in a tapered surface so as to adapt to that of said inner part;

(b) a radially outer member having at one end thereof a flange portion extending radially outwardly and fixedly secured through said flange portion to one end face of said outer part by means of bolts, the outer peripheral surface being formed in a tapered surface so as to adapt to that of said outer part; and (c) a resilient member allowing the inner and outer peripheral surfaces thereof to fix in seizure to the radially outer surface of said inner member and the radially inner surface of said outer member, respectively.

2. A sprocket wheel of an endless track-type vehicle including a substantially annular-shaped inner part of a hub fixedly mounted on a sprocket wheel driving shaft, a substantially annular-shaped outer part of the hub arranged at the radially outside of said inner part so as to form an annular space therebetween, a plurality of deformable resilient block segments equispacedly and fixedly inserted into said annular space, and stopper means for preventing said deformable resilient block segments from their respective excessive deformation, the improvement wherein said stopper means comprises:

(a) an annular stopper plate fixedly secured to an end face of the outer part and having a plurality of first round openings formed at intervals of an equal distance from one another along the circumference of the end face thereof;

(b) a peripherally surrounding protrusion extending radially inwardly from the inner peripheral surface of the outer part and having a plurality of second round openings formed in position at intervals of an equal distance from one another along the circumference of the end face thereof so as to correspond to the respective positions of the first openings of the stopper plate, the second openings having the substantially same diameter as that of the first openings;

(c) a peripherally surrounding projection extending radially outwardly from the outer peripheral surface end of the inner part and inserted between said stopper plate and said radially inwardly extending protrusion of the outer part leaving a circumferential clearance between the outer peripheral surface thereof and the inner peripheral surface of the outer part, said radially outwardly extending projection having a plurality of round notches formed in position at intervals of an equal distance from one another along the circumference of the end face thereof so as to correspond to the respective positions of the first and second openings, each of said round notches having a relatively large diameter as compared with the first and second openings; and (d) a plurality of connecting pins respectively press-fitted into the first and second openings and each of which is arranged such that an annular clearance having the substantially same dimension as that of said circumferential clearance is defined by and between the peripheral surface of each of said pins and the inner peripheral surface of each of said round notches.

3. A sprocket wheel as claimed in claim 2 wherein shock-absorbing and lubricating medium is filled up said circumferential clearance and said annular clearance formed around each of said connecting pins.

* * * * *